United States Patent Office 2,788,602
Patented Apr. 16, 1957

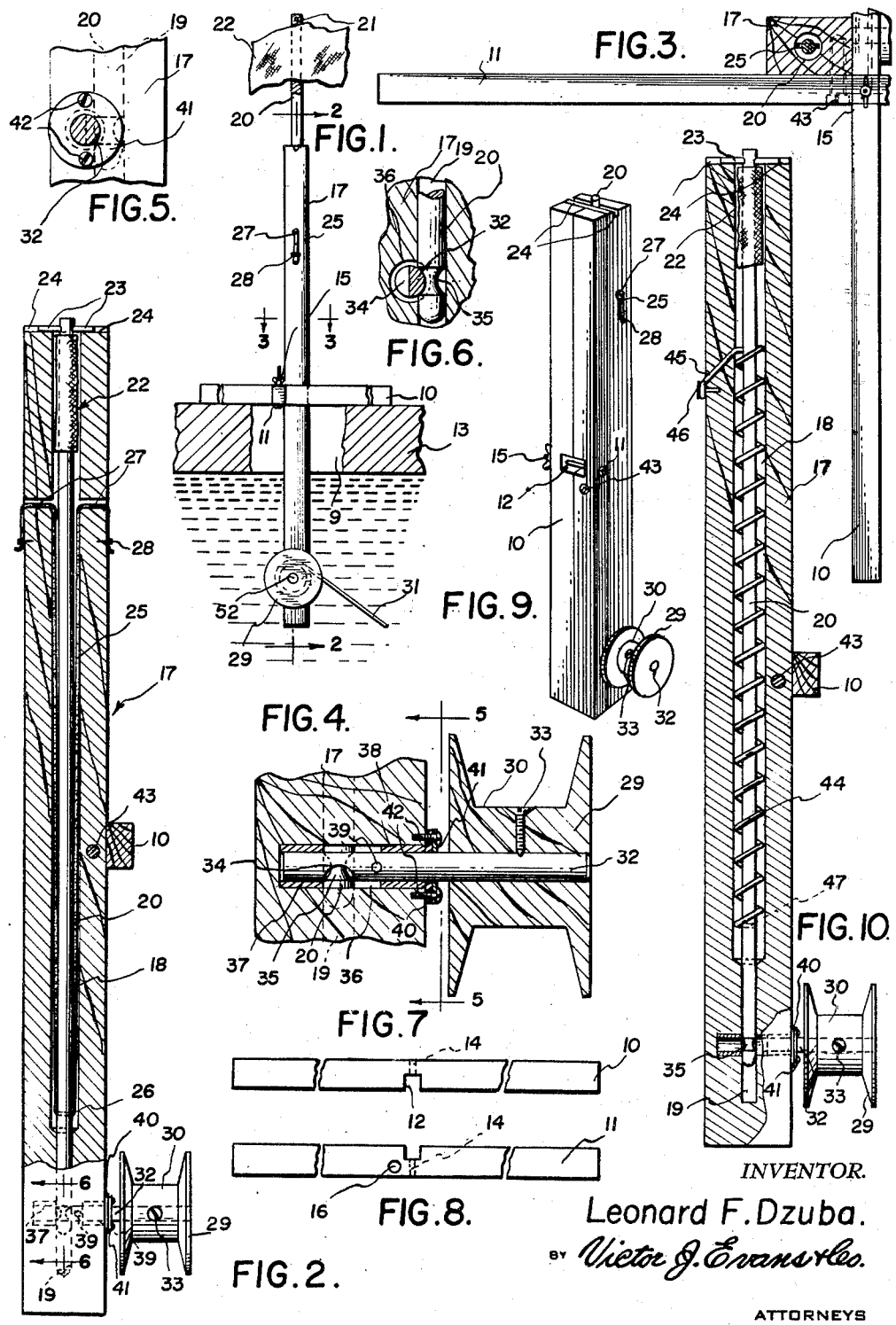

2,788,602
FISHING ACCESSORY
Leonard F. Dzuba, Carrollton, Mich.
Application May 10, 1955, Serial No. 507,335
4 Claims. (Cl. 43—17)

This invention relates to fishing equipment, and more particularly to a signal which is actuated when a fish strikes a fishhook or fishing line.

The object of the invention is to provide a signal which is especially suitable for use by persons fishing through a hole in ice whereby when a fish strikes the line, a flag is actuated so that the person can know to retrieve the fish.

Another object of the invention is to provide a signal for warning or giving notice that a fish has struck the line so that the fisherman can readily pull in the fish, whereby the present invention eliminates the necessity of having the fisherman constantly watch the line until the fish strikes.

A further object of the invention is to provide a signal for use by fishermen, which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the signal, showing a portion of the device projecting through a hole in ice, and with the flag in raised position, and with parts broken away and in section.

Figure 2 is a sectional view taken on the line 2—2 of Figure 1.

Figure 3 is a sectional view taken on the line 3—3 of Figure 1.

Figure 4 is a sectional view taken through the spool.

Figure 5 is a sectional view taken on the line 5—5 of Figure 4.

Figure 6 is a sectional view taken on the line 6—6 of Figure 2.

Figure 7 is a plan view of one of the beams.

Figure 8 is a plan view of the other beam.

Figure 9 is a perspective view illustrating the parts in folded position as when the device is not being used so that it occupies a minimum amount of space for storage or shipment.

Figure 10 is an elevational view of a modified arrangement, with parts broken away and in section.

Referring in detail to the drawings, the numerals 10 and 11 designate a pair of similar beams which are arranged at right angles with respect to each other when the device is being used, Figure 3. The beams 10 and 11 are provided with cutouts 12 which are adapted to register with each other, and each of the beams is provided with an aperture 14. A suitable securing element such as a bolt and nut assembly 15 extends through the apertures 14 for detachably connecting the beams 10 and 11 together. The beam 11 is further provided with an opening 16.

There is further provided a base 17 of rectangular shape, and the base 17 may be made of any suitable material such as wood. The base 17 is vertically disposed when the device is being used, and the lower portion of the base 17 is adapted to project through an opening or hole 9 in ice 13 as when the fisherman is fishing through such hole in the ice. A reciprocatory rod 20 is movably mounted in the bore 18, and the lower end of the base 17 is provided with a chamber 19 which communicates with the bore 18, the chamber 19 being smaller than the bore 18.

There is provided in the upper end of the rod 20 a slot 21, and a flag, of any suitable material, 22 is secured within the slot 21. Normally, the flag 22 may be wrapped around the upper portion of the rod 20 and positioned within the top of the bore 18, but when the rod 20 is moved upwardly as when a fish strikes the line, then the flag 22 will be exposed and will open so that the fisherman will know that a fish has struck the line.

A means is provided for limiting downward movement of the rod 20, and this means comprises a stop pin 23 which extends transversely through the upper end of the rod 20. The pin 23 is adapted to be seated or received in grooves 24 in the upper end of the base 17.

There is further provided a resilient means for urging or biasing the rod 20 to its raised position, and this resilient means comprises a rubber band 25 which extends through an aperture or opening 26 in the lower portion of the rod 20. Portions of the rubber band 25 extend through opposed openings 27 in the base 17, and the ends of the rubber band 25 are secured to the outer surface of the base by means of suitable securing elements such as staples 28.

Arranged exteriorly of the base 17 adjacent the lower end thereof is a spool 29 which is provided with an annular groove 30 for receiving a fishing line 31. The spool 29 is connected to a shaft 32 through the medium of a screw 33, and the other end of the shaft 32 is provided with a semi-circular or semi-cylindrical recess 34. This recess 34 is adapted to move into and out of engagement with an annular groove 35 which is formed in the lower end of the rod 20. Thus, when the recess 34 engages the groove 35, the rubber band 25 will be able to shift the rod 20 upwardly in the bore 18.

The inner end of the shaft 32 projects into a cutout 36 which communicates with the chamber 19, and bushings 37 and 38 are circumposed on the shaft 32, and these bushings are positioned in the cutout 36. A pin 39 extends transversely through the shaft 32 for preventing the shaft 32 from accidentally moving out of the cutout 36. For preventing water from entering the cutout 36, a rubber washer 40 is held in place by means of a metal disc 41, and the members 40 and 41 may be retained in place by suitable securing elements such as screws 42.

The base 17 may be secured to the beam 11 through the medium of a bolt or screw 43.

Referring to Figure 10 of the drawings there is shown a modified resilient means for urging the rod 20 upwardly. Thus, in Figure 10 a coil spring 44 is circumposed on the rod 20, and the coil spring 44 has an upper end portion 45 secured to the base 17 by means of a securing element 46. The coil spring 44 has its lower end portion 47 arranged in engagement with a suitable opening or aperture in the bottom of the rod.

From the foregoing it is apparent that there has been provided a signal which is especially suitable for use by persons fishing below the surface of ice such as the ice 13. In use, a hole 19 may be arranged in any ice 13, and the lower end of the base 17 is extended down through the hole 9. The pair of right angularly arranged beams 10 and 11 rest on the upper surface of the ice 13 as shown in Figure 1, whereby the signal is conveniently supported. The spool 29 and fishing line 31 are positioned in the body of water below the ice 13. Normally, the parts are in the position shown in Figure 2 so that as shown in Figure 6 the shaft 32 engages the groove 35 in the rod 20 to retain the rod 20 and flag 22 in their lowered position. Then, when a fish strikes the line 31, the reel or spool 29 is rotated and this rotates the shaft 32. As the shaft 32 rotates, the recess 34 in the shaft 32 moves into registry with the groove 35 in the rod 20 whereby the rubber band 25 will quickly urge or bias the rod 20 to its raised position. When the rod 20 moves to its raised position, the flag 22 will be exposed and will show as in Figure 1 whereby the fisherman will know that a fish has struck the line. After the fish has been retrieved, the parts can be reset or returned to the position shown in Figures 1 and 6. Instead of using the rubber band 25 to bias the rod and flag upwardly, the coil spring 44 can be used as shown in Figure 10. When the device is not being used, as for example when it is being shipped or stored, the bolt 43 can be disengaged from the position shown in Figure 3 and the bolt and nut assembly 15 can be removed so that the parts can be moved to the position shown in Figure 9. Thus, the pair of beams 10 and 11 can be arranged in side by side relation with respect to each other and secured together and secured to the base so as to provide a compact unit. The opposed recesses 12 interfit with each other or register with each other when the beams are in the position shown in Figures 1 and 3 so as to provide an effective joint therebetween. The washer 40 maintains the interior of the device waterproof.

The pin 39 retains the shaft 32 in the base. The device of the present invention will not be affected by strong winds nor will it be affected by freezing conditions. The bottom of the chamber 19 is below the bottom of the rod 20 so that in the event that any dirt accidentally gets in the chamber, the device will still function.

I claim:

1. In a device of the character described, a pair of horizontally disposed beams arranged at right angles with respect to each other and detachably connected together, a vertically disposed base extending upwardly from said beams and connected thereto, said base being provided with an elongated bore, there being a chamber in the lower end of said bore of smaller diameter than said bore, a rod reciprocably arranged in said bore and chamber, resilient means for urging said rod upwardly, a stop member on the upper end of said rod for limiting downward movement of said rod, there being an annular groove in the lower end of said rod, there being a cutout in the lower end of said base communicating with said chamber, a spool arranged exteriorly of said base, a shaft extending from said spool and projecting into said cutout, there being a semi-circular recess in said shaft for engagement with the groove in said rod, and a flag on the upper end of said rod.

2. The structure as defined in claim 1, wherein said resilient means comprises a coil spring circumposed on said rod, and having its lower end connected to said rod, and its upper end connected to said base.

3. The structure as defined in claim 1, wherein said resilient means comprises a rubber band, there being an aperture in said rod for the projection therethrough of said rubber band, said base having opposed openings for the projection therethrough of portions of said rubber band, and securing elements connecting said rubber band to said base.

4. A fishing signal device comprising a pair of horizontally disposed beams arranged at right angles with respect to each other and detachably connected together, said beams being provided with registering cutout portions, a vertically disposed base extending upwardly from said beams and connected thereto, the lower end of said base being adapted to project through a hole in a body of ice, said base being provided with an elongated bore, there being a chamber at the lower end of said bore of smaller diameter than said bore, a rod reciprocably arranged in said bore and chamber, resilient means for urging said rod upwardly, a stop member extending transversely through the upper end of said rod for limiting downward movement of said rod, there being grooves in the upper end of said base for receiving said stop member, there being an annular groove in the lower end of said rod, there being a cutout portion in the lower end of said base communicating with said chamber, a spool arranged exteriorly of said base, a shaft extending from said spool and projecting into said last named cutout portion, a pin extending transversely through the shaft for preventing the shaft from accidentally moving out of the last named cutout portion, a washer on said shaft for preventing water from entering the last named cutout portion, there being a semi-circular recess in said shaft for engagement with the groove in said rod, there being a slot in the upper end of said rod, a flag on the upper end of said rod engaging said slot, said flag being normally wrapped around the upper portion of the rod and positioned within the top of the bore but when the rod is moved upwardly as when a fish strikes the device, then the flag will be exposed and will open so that the fisherman will know that a fish has struck, said resilient means comprising a coil spring circumposed on said rod and having its lower end connected to said rod and its upper end connected to said base, the bottom of the chamber being below the bottom of the rod so that in the event that any dirt accidentally gets in the chamber, the device will still function.

References Cited in the file of this patent

UNITED STATES PATENTS

| | | |
|---|---|---|
| 1,391,002 | Morin | Sept. 20, 1921 |
| 1,475,257 | Bottone | Nov. 27, 1923 |
| 2,502,231 | Oberg | Mar. 28, 1950 |
| 2,598,778 | Fred | June 3, 1952 |
| 2,693,046 | Langevin | Nov. 2, 1954 |